Oct. 14, 1958    E. A. FERRIS    2,856,045
ONE-WAY CLUTCHES
Filed Dec. 27, 1955
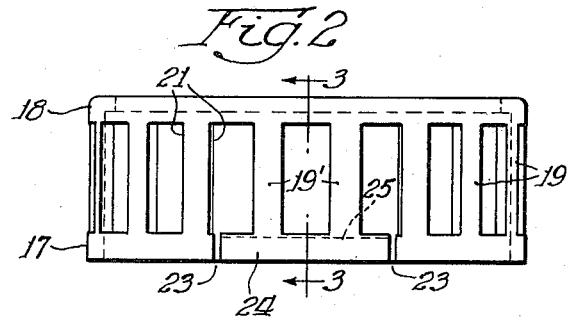
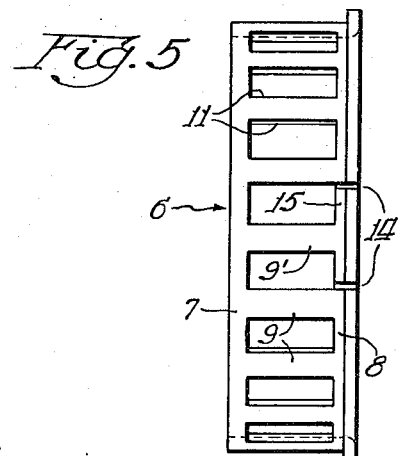
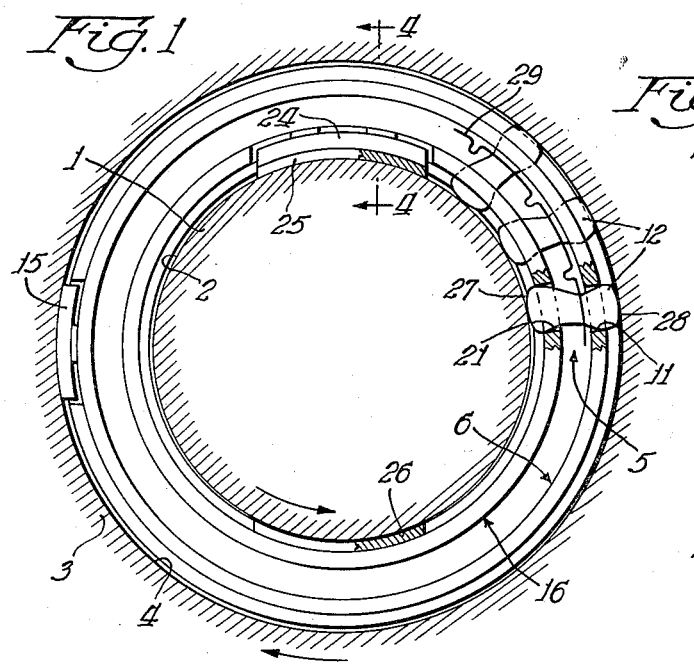
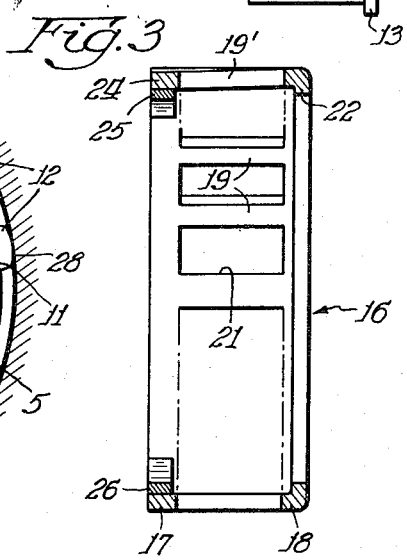
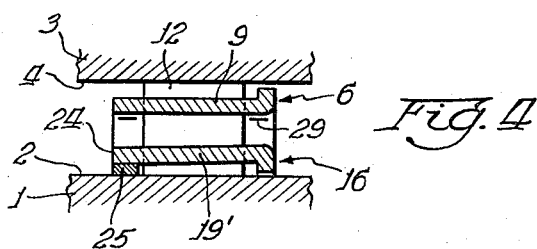
Inventor:
Ernest A. Ferris
By:
Donald W. Banner Atty.

United States Patent Office 2,856,045
Patented Oct. 14, 1958

2,856,045

ONE-WAY CLUTCHES

Ernest A. Ferris, Elmhurst, Ill., assignor to Borg-Warner Corporation, a corporation of Illinois Application December 27, 1955, Serial No. 555,375

7 Claims. (Cl. 192—45.1)

This invention relates generally to one-way engaging devices, and more particularly, to tiltable gripper type one-way engaging devices adapted to connect relatively rotatable races during their relative rotation in one direction which incorporates a pair of relatively rotatable cage means constructed and arranged to minimize free wheel wear on the grippers during the overrunning condition of the device.

In the copending application of Daniel M. Wade, Serial No. 555,104, entitled "One-Way Clutches," there is described and claimed a cage type, tiltable gripper one-way engaging device in which the cage is provided with a flanged end surface, which has a segment severed from the remainder of this flanged end surface and connected to the opposite end surface by a cross bar, the segment and cross bar being bent out of the plane of the adjacent portions of the device to frictionally engage the associated race surface. The present invention varies from that particular construction by combining many of the advantageous features thereof with a "double flange" arrangement which is especially adapted for use in (although not limited to) one-way engaging devices which are relatively large in diameter. More particularly, it has been noted in large diameter clutches that the provision of a flange on both axially facing ends of the cage means is very desirable, and it is furthermore of particular importance that a substantial amount of frictional engagement between the cage and the race must be effected, this frictional engagement, nevertheless, remaining in a predetermined range.

It is therefore one object of the present invention to provide an improved one-way engaging device of the tiltable gripper type having improved means for effecting frictional drag of the cage means on the associated race.

Another object of the present invention is the provision of an improved one-way engaging device in which cage means are employed having a single flanged end surface along one axially facing side thereof, the other axially facing end surface having openings therein which define a segment attached to the flanged end surface by cross bars, the segment carrying insert means shaped to complementarily engage the associated race.

Another object is the provision of a device in accordance with the preceding object in which the cross bars attached to the segments are bent to effect the frictional drag of the segment on the associated race which is of a particular, desired magnitude.

Another object of the present invention is the provision of an improved device in accordance with the preceding objects in which the segment engages the race at a position spaced from that portion of the race engaged by the tiltable grippers.

Another object is the provision of a device in accordance with the preceding objects in which the flanged end section of the cage means are flexed to determine the drag of the cage means on the associated race.

Another object is the provision of a device in accordance with the preceding objects in which a pair of cage means are provided, the cage means each having a plurality of circumferentially spaced openings extending therethrough, the circumferentially facing sides of the openings and the circumferentially facing sides of the sprags extending through the openings being complementarily formed so as to remain in engagement with only bearing clearance therebetween throughout the normal tilting range of the grippers.

Other objects and features of the invention will be readily apparent to those skilled in the art from the specification and appended drawing illustrating certain preferred embodiments in which:

Figure 1 is a partial, elevational view of a one-way engaging device in accordance with the present invention showing the device in assembled position between inner and outer races;

Figure 2 is a plan view of the inner cage shown in Figure 1;

Figure 3 is a sectional view along the plane of line 3—3 of Figure 2;

Figure 4 is a partial, sectional view along the plane of line 4—4 of Figure 1.

Figure 5 is a view of the outer cage.

The drawings disclose an inner race 1 having a cylindrical outer surface 2, and an outer race 3 having an inner cylindrical surface 4. Disposed between the race surfaces 2 and 4 so as to couple the races upon their attempted relative rotation in one direction is a one-way engaging device 5 of the general type described and claimed in the copending application of Harry P. Troendly et al., Serial No. 379,534, entitled One-Way Clutch. This one-way engaging device comprises an outer generally rigid cage 6 of substantially cylindrical configuration. Cage 6 has along one axially facing side thereof a generally circular end member 7, and on the opposite side a generally circular end member 8. Extending between the members 7 and 8 are a plurality of spaced cross bars 9 which, with the end members, define a plurality of openings 11 in the cage 6 adapted to receive the upper end portions of tiltable sprags 12. The end member 8 of the cage 6 is provided with an upstanding flange 13, the outer periphery of which has a dimension which is slightly less than the diameter defined by the surface 4 of the race 3. As indicated best in Figure 5, the end member 8 is provided with openings 14, each of limited width, extending therethrough and communicating with a pair of adjacent openings 11. The openings 14 interrupt the continuity of the end member 8 to provide a segment 15 thereof which is disconnected from the adjacent portions of the end member 8 by virtue of the openings 14, and which is supported from the end member 7 by one of the cross bars 9, which, for convenience, has been indicated by the numeral 9'. The cross bar 9' is bent outwardly, as may be seen from an inspection of Figure 1, out of the circular plane in which the adjacent cross bars 9 lie, to effect engagement of the outer periphery of the segment 15 with the surface 4 of race 3.

In manufacturing the outer cage 6 the cage is originally formed without the openings 14, the outer periphery of the flange 13 being finished smooth, and all of the cross bars 9 being aligned in a common circular plane. The openings 14 (which are preferably very small in circumferential extent) are then cut into the end member 8', and the cross bar 9 then deflected to the degree desired to effect the predetermined degree of drag by the segment 15 on the associated race. If desired, the opposite ends of segment 15 may be tapered slightly inwardly to ensure against the sharp corners thereof "digging into" the associated race.

The one-way engaging device 5 further comprises an inner cage 16 of substantially cylindrical contour and over the main portion having an internal dimension slightly in excess of the diameter of the race surface 2. Cage 16 comprises a generally circular end member 17 on one axially facing side and a generally circular end member 18 on the opposite side, the members 17 and 18 being connected together by a plurality of spaced cross bars 19. The members 17 and 18 and the cross bars 19 define a plurality of spaced openings 21 adapted to receive an internal portion of the sprags 12. The end member 18 is provided with an inwardly extending flange 22, normally slightly spaced from the surface to the race 1. As best illustrated in Figure 2, end member 17 is provided with a pair of spaced openings 23 of limited circumferential extent and respectively communicating with one of the openings 21. The openings 23, therefore, in effect result in a generally T-shaped segment being formed in the cage 16 which comprises a segment 24 of end member 17 separated from the remaining portions of that end member and connected to the opposite end member 18 by one or more of the cross bars 19, which for convenience have been indicated by the numeral 19'. The radially innermost surface of the segment 24 is provided with an insert 25 of brass or like material, and the cross bars 19' are forced inwardly against the bias of the flanged end member 18 to effect engagement of the insert 25 with the surface 2 of the race 1. As best shown in Figure 1, the innermost surface of segment 25 is curved complementarily to the curvature of surface 2 whereby a continous engagement between that surface and the insert is effected throughout the length of the insert. The ends of segment 25 are preferably slightly tapered outwardly to ensure against scoring of the race surface 2. At a point 180° spaced from segment 24 cage 16 is provided with an insert 26 similar to the insert 25 previously described. As best illustrated in Figure 3 the innermost surface of insert 26 will be radially spaced from the common center of the races substantially the same distance as the inner surface of the flange 22 on cage 17. As a result, when the segment 24-insert 25 "T-bar" is disposed in engagement with the race surface 2 the cage 16 is moved slightly off-center with regard to the center of the races so that the inner surface of insert 26 and the inner surface of the flange 22 axially aligned with segment 26 engage the race surface 2, the result being comparable to those obtainable with a cage having a double flange.

The cage 16 is fabricated in a manner similar to the one previously described with respect to cage 6, the inner surface of the flange 22 being finished smooth and the inserts 25 and 26 being fastened to the cage by suitable means, the openings 23 then being cut through the end member 17 and the cross bars 19' then being deflected to effect the desired degree of engagement between the insert 25 and the surface 25 and the surface 2 of the race 1 when the clutch 5 is in assembled position with the races.

Th sprags 12 respectively have an inner race engaging surface 27 and an outer race engaging surface 28 which are eccentrically curved so as to wedge between the races during attempted relative rotation thereof in one direction only. During opposite relative rotation of the races the sprags 12 are tilted to a position to permit such rotation. The sprags 12 and the openings 11 and 21 in the cages 6 and 16, respectively, are so constructed and arranged as to effect common axially tilting movement of all of the sprags 12, as described with more particularity in the aforementioned copending Troendly application. More particularly, the circumferentially facing sides of the sprags 12 and the circumferentially facing sides of the openings in the cages are constructed and arranged so that these sides on the sprags and cages remain in engagement—with only bearing clearance therebetween—throughout the normal tilting range of the sprags, to the end that tilting movement of any one sprag is transmitted through the cages 6 and 16 to all of the other sprags. As a result, all of the sprags will move angularly in unison and to the same degree, so that the load is not transferred to only a few sprags but is distributed throughout all of the sprags.

Disposed between the relatively rigid cages 6 and 16 is an intermediate, flexible, sheet metal cage 29 having a plurality of spaced openings therein through which the sprags 12 extend. The cage 29 openings are defined in part by a straight axially extending surface and a spring tab spaced from this surface and disposed in engagement with one side of the associated sprag 12 to force it against that straight surface and bias the sprag into engagement with the surfaces 2 to 4 (and in a generally counterclockwise direction in the view of Figure 1). This spring cage is more particularly described in the aforementioned copending application, and forms the subject matter of a separate patent application of Harry P. Troendly et al., Serial Number 263,064, and entitled One-Way Engaging Device.

It should be noted that the spring cage 29, by biasing the sprags 12 as aforementioned, in effect biases the race engaging surfaces 27 and 28 of the sprags into engagement with the surfaces 2 and 4 of the races 1 and 3, respectively; as a result during the overrunning condition of the device—when the races rotate in the relative direction indicated by the arrows in Figure 1, the effect of the spring cage 29 is to cause a drag of the sprags on the races and excessive wear on the race engaging surfaces 27 and 28 of the sprags 12. With the device of the present invention, however, this wear is minimized. More specifically, assuming the race 1 to be fixed and the race 3 to be rotating in the direction illustrated by the arrow placed thereon in Figure 1, the one-way engaging device 5 would tend to move with the outer race both by virtue of the friction between the surface 4 of the outer race and the surfaces 28 of the sprags 12, and by virtue of the frictional engagement between the outermost surface of the segment 15 with the surface 4. It should be noted, however, that the innermost surface of the insert 25 on segment 24 on the inner cage 16 and insert 26 are in frictional engagement with the surface 2 of race 1. As a result, while the device 5 moves generally clockwise (in the view of Figure 1) inserts 25 and 26 drag along the inner race surface 2 so that the inner cage 16 moves in a generally counterclockwise direction with respect to the outer cage 6. This relative movement between the cages effects a rotation of the sprags 12—clockwise as illustrated in Figure 1—to effectively "lift off" the surfaces 27 thereof from the race surface 2. As a result, the wear on these surfaces 27 is minimized, thereby prolonging significantly the life of the engaging device 5.

It will be seen from the foregoing explanation that the relative rotation between the cages 6 and 16 and the consequent tilting of the sprags 12 during overrunning, is effected by virtue of the frictional engagement between the segment 15 and inserts 25 and 26 with their associated races. It has been found when the cage drag effected by the engagement of inserts 25 and 26 on the surface 2 of race 1 is of the order of 1½ to 3 times the drag effected by the sprag cage 29, and where the drag of cage 6 on outer race 3—effected by segment 15—is approximately two or three times the drag of cage 16, the life of the clutch is materially increased but back-lash is substantially eliminated.

It should be understood that the "T-bar" on the inner cage 16—comprising cross bars 19', segment 24 and insert 25 may be of any desired length to provide any frictional area between cage 16 and race 1 as desired. In addition, both cages may be provided with inserts comparable to the inserts 25 and 26. It should also be noted that, with respect to cage 16, the force with which insert 25 engages race 1 is dependent upon the degree of twist applied to flanged end member 18. This flanged end member will be obviously relatively stiff so that the desirable degree of cage drag may be effected even in the case of large diameter clutches where such requisite degree of drag may be very large.

It will therefore be apparent that the device of the present invention provides for controlling frictional drag between the cages and the associated races, the drag means in no way effecting the portion of the race surfaces engaged by the sprags. In addition, there is little or no circumferential movement of the cross bars 9' or 19' with respect to the remaining portions of the cages so that the openings 11 and 21 adjacent the "T-bar" do not significantly change in dimension. Furthermore a wide and flexible range of degree of drag is possible so that the device of the present invention may be used on either small embodiments or very large ones. In addition it should be particularly noted that with the device of the present invention at least one of the cages is—in effect—a double flanged cage, which is particularly desirable under many circumstances.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

I claim:

1. A one-way engaging device adapted to operate between a pair of races comprising a plurality of tiltable grippers adapted to be mounted between the races, a pair of relatively rotatable cage means adapted to be mounted between the races having first and second end portion means and a plurality of cross bar means extending therebetween defining spaced apertures in said cage means through which the ends of said grippers extend, said first end portion means including a radially extending flange, said cage means including a plurality of opening defining means extending through said second end portion means and communicating with certain of said spaced apertures to define therewith a generally T-shaped cage section including a part of said second end portion and cross bar means connected to said first end portion means, and insert means on said part adapted to engage the associated race.

2. A one-way engaging device adapted to operate between a pair of races comprising a plurality of tiltable grippers adapted to be mounted between the races, a pair of relatively rotatable cage means adapted to be mounted between the races having first and second end portion means and a plurality of cross bar means extending therebetween defining spaced apertures in said cage means through which the ends of said grippers extend, said first end portion means including a radially extending flange, said cage means including opening defining means extending through said second end portion means defining an end portion part separated from the remainder of said second end portion means, said end portion part being connected to said first end portion means by certain of said cross bar means, said certain cross bar means and flange being constructed and arranged to yieldably position said end portion part in radially spaced relation with respect to the remainder of said second end portion means.

3. A one-way engaging device adapted to operate between a pair of races comprising a plurality of tiltable grippers adapted to be mounted between the races, a pair of relatively rotatable cage means adapted to be mounted between the races having first and second end portion means and a plurality of cross bar means extending therebetween defining spaced apertures in said cage means through which the ends of said grippers extend, said first end portion means including a radially extending flange, said apertures and tiltable grippers being constructed and arranged to effect constant engagement between the circumferentially facing sides of said grippers and the circumferentially facing sides of said openings with only bearing clearance therebetween throughout the operating tilting range of said grippers, said cage means including a pair of opening defining means extending through said second end portion means and communicating with certain of said spaced apertures to define therewith a generally T-shaped cage section including a part of said second end portion and cross bar means connected to said first end portion means, and insert means on said section adapted to engage the associated race.

4. A one-way engaging device adapted to operate between a pair of races comprising a plurality of tiltable grippers adapted to be mounted between the races, a pair of relatively rotatable cage means adapted to be mounted between the races having first and second end portion means and a plurality of cross bar means extending therebetween defining spaced apertures in said cage means through which the ends of said grippers extend, said apertures and tiltable grippers being constructed and arranged to effect constant engagement between the circumferentially facing sides of said grippers and the circumferentially facing sides of said openings with only bearing clearance therebetween throughout the operating tilting range of said grippers, said first end portion means including flange means having a finished smooth surface adapted to face the race adjacent said flanged cage means, and means defining a pair of openings extending through said second end portion means and communicating with certain of said spaced apertures to define therewith a generally T-shaped cage section including a portion of said second end portion means and cross bar means, and insert means mounted to said second end portion means, said insert means being adapted to engage the associated race.

5. A one-way engaging device adapted to operate between a pair of races comprising a plurality of tiltable grippers adapted to be mounted between the races, a pair of relatively rigid and rotatable cage means adapted to be mounted between the races having first and second end portion means and a plurality of cross bar means extending therebetween defining spaced apertures in said cage means through which the ends of said grippers extend, said first end portion means including a radially extending flange, spring means adapted to bias said tiltable grippers into engagement with said races, said cage means including a plurality of opening defining means extending through said second end portion means and communicating with certain of said spaced apertures to define therewith a generally T-shaped cage section including a part of said second end portion and cross bar means connected to said first end portion means, insert means on said section adapted to engage the associated race, said flange and certain cross bar means being constructed and arranged to yieldably position said insert means in engagement with the associated race surface with a biasing force adapted to effect a drag of said insert on the associated race which is of the order of 1½ to 3 times the drag effected by said spring.

6. A one-way engaging device adapted to operate between a pair of races comprising a plurality of tiltable grippers adapted to be mounted between the races and wedge therebetween upon attempted relative rotation of the races in one direction, cage means through which said grippers extend adapted to be mounted between the races having first and second end portion means and a plurality of cross bar means extending therebetween defining spaced gripper receiving apertures, said first end portion means including a radially extending flange, said cage means comprising a generally T-shaped cage section formed of a part of said second end portion means and certain of said cross bar means connected to said first end portion, and insert means carried by said cage section adapted to engage the associated race.

7. A one-way engaging device adapted to operate between a pair of races comprising a plurality of tiltable grippers adapted to be mounted between the races and wedged therebetween upon attempted relative rotation of the races in one direction, cage means through which said grippers extend adapted to be mounted between the races comprising first and second end portion means and a plurality of cross bar means extending therebetween defining spaced gripper receiving apertures, said first end portion means including a radially extending flange, means defining a pair of spaced openings in said second end portion means communicating with certain of said apertures whereby a generally T-shaped cage section is formed comprising a part of said second end portion means and certain of said cross bar means connected to said first end portion, first insert means of anti-friction material carried by said part of said second end portion means comprising a surface complementarily formed to engage the associated race surface, and second insert means of anti-friction material mounted to said second end portion means in a position diametrically opposite said part of said second end portion means comprising a surface complementarily formed to engage the associated race surface.

References Cited in the file of this patent

UNITED STATES PATENTS 2,404,221   Dodge _____ July 16, 1946

UNITED STATES PATENT OFFICE
CERTIFICATE OF CORRECTION

Patent No. 2,856,045                            October 14, 1958

Ernest A. Ferris

It is hereby certified that error appears in the printed specification of the above numbered patent requiring correction and that the said Letters Patent should read as corrected below.

Column 3, line 56, strike out -- and the surface 25 --.

Signed and sealed this 21st day of July 1959.

(SEAL)
Attest:

KARL H. AXLINE
Attesting Officer

ROBERT C. WATSON
Commissioner of Patents